US010642271B1

(12) United States Patent
Graber et al.

(10) Patent No.: US 10,642,271 B1
(45) Date of Patent: May 5, 2020

(54) VEHICLE GUIDANCE CAMERA WITH ZOOM LENS (71) Applicant: Amazon Technologies, Inc., Seattle, WA (US)

(72) Inventors: Sarah Graber, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 15/249,225

(22) Filed: Aug. 26, 2016

(51) Int. Cl.
G05D 1/00 (2006.01)
H04N 5/232 (2006.01)
(Continued)

(52) U.S. Cl.
CPC ......... G05D 1/0094 (2013.01); B64C 39/024 (2013.01); B64D 47/08 (2013.01); G02B 3/0006 (2013.01); G02B 7/005 (2013.01); G02B 7/09 (2013.01); G02B 15/16 (2013.01); G05D 1/101 (2013.01); H04N 5/23238 (2013.01); H04N 5/23296 (2013.01); H04N 13/246 (2018.05); H04N 13/296 (2018.05)

(58) Field of Classification Search
CPC ............... G02B 13/02; G02B 27/0081; H04N 5/23296; H04N 5/23232; H04N 5/23258; H04N 5/247; H04N 5/222; H04N 5/225; H04N 13/0242; H04N 13/246; H04N 7/18; G05D 1/0094; G05D 1/101; G05D 1/0055; G05D 1/0038; G05D 1/0088; B64C 39/024; G06T 7/292; G06T 7/26; G06T 7/0002; F41G 7/34; G06F 21/44
See application file for complete search history.

(56) References Cited

U.S. PATENT DOCUMENTS 6,025,790 A * 2/2000 Saneyoshi ............ G05D 1/0251
340/946
6,130,705 A * 10/2000 Lareau ..................... G01C 3/08
348/144
(Continued)

OTHER PUBLICATIONS

Samuel Hill "Scalable Multi-view Stereo Camera Array for Real World Real-Time Image Capture and Three-Dimensional Displays"; ©2004 MIT (Year: 2004) (Year: 2004).*
(Continued)

Primary Examiner — Dramos Kalapodas
(74) Attorney, Agent, or Firm — Lee & Hayes, P.C.

(57) ABSTRACT

A guidance camera deployed on a vehicle may be equipped with a zoom lens configured to change a zoom level of the guidance camera. The zoom level may be changed in response to a scenario performed by a vehicle equipped with the guidance camera, vehicle controls issued by a vehicle controller, and/or based on identification of objects in imagery captured by the guidance camera. The zoom lens may be implemented as a lens array that includes different lenses, as a wheel lens array that includes different lenses, or by a light direction device that guides light from a specific lens of different lenses into the guidance camera. Stereo cameras may be configured with the zoom lenses, and may be repositioned to ensure suitable overlap in a field of view to enable calculation of a distance of objects captured in the imagery of the stereo camera.

20 Claims, 9 Drawing Sheets (51) Int. Cl.
*G02B 15/16* (2006.01)
*G02B 7/09* (2006.01)
*G02B 3/00* (2006.01)
*G02B 7/00* (2006.01)
*B64C 39/02* (2006.01)
*B64D 47/08* (2006.01)
*G05D 1/10* (2006.01)
*H04N 13/246* (2018.01)
*H04N 13/296* (2018.01)

(56) References Cited

U.S. PATENT DOCUMENTS

| | | | | |
|---|---|---|---|---|
| 6,281,970 | B1 * | 8/2001 | Williams | G01C 21/00 250/334 |
| 8,525,088 | B1 * | 9/2013 | Ell | F41G 3/145 244/3.1 |
| 9,304,305 | B1 * | 4/2016 | Paul | G02B 15/163 |
| 9,505,494 | B1 * | 11/2016 | Marlow | B64C 39/024 |
| 9,563,201 | B1 * | 2/2017 | Tofte | G05D 1/0038 |
| 9,613,538 | B1 * | 4/2017 | Poole | H04N 7/183 |
| 9,665,098 | B1 * | 5/2017 | Lema | G05D 1/0088 |
| 9,703,288 | B1 * | 7/2017 | Zhang | H04N 5/2257 |
| 9,741,255 | B1 * | 8/2017 | Navot | G08G 5/0082 |
| 9,927,809 | B1 * | 3/2018 | Tofte | G05D 1/0038 |
| 2012/0026366 | A1 * | 2/2012 | Golan | H04N 5/232 348/240.2 |
| 2013/0206896 | A1 * | 8/2013 | Dicander | F41G 7/303 244/3.11 |
| 2016/0018626 | A1 * | 1/2016 | Hou | G02B 15/16 359/691 |
| 2017/0041553 | A1 * | 2/2017 | Cao | G06T 5/50 |
| 2017/0045894 | A1 * | 2/2017 | Canoy | G05D 1/0676 |
| 2017/0186166 | A1 * | 6/2017 | Grunnet-Jepsen | H04N 13/239 |
| 2017/0264833 | A1 * | 9/2017 | Barnes | H04N 5/332 |
| 2018/0032077 | A1 * | 2/2018 | Moon | B64C 39/02 |
| 2018/0054604 | A1 * | 2/2018 | Boyd | H04N 13/239 |
| 2018/0173220 | A1 * | 6/2018 | Wang | G06F 3/04883 |
| 2018/0280780 | A1 * | 10/2018 | Nakao | B64C 39/024 |
| 2019/0004512 | A1 * | 1/2019 | Liu | H04N 5/247 |

OTHER PUBLICATIONS

Samuel Hill "Scalable Multi-view Stereo Camera Array for Real World Real-Time Image Capture and Three-Dimensional Displays"; © 2004 MIT (Year: 2004).*

Richard Moore "Vision Systems for Autonomous Aircraft Guidance"; University of Queensland Australia; 2012 (Year: 2012).*

\* cited by examiner

VEHICLE GUIDANCE CAMERA WITH ZOOM LENS

BACKGROUND

Some unmanned aerial vehicles (UAVs) use cameras for object detection and navigation. These cameras typically have a fixed focal length and are often rugged, inexpensive, and able to capture quality images. However, use of fixed focal length cameras may not be ideal when a UAV experiences changes in flight, where greater granularity or a wider field of view may be useful.

Stereo camera pairs are used in computer vision to create a three-dimensional model of the surrounding environment. One requirement for such a system is for the cameras to be spaced apart from each other so that there is a measurable difference in the image seen by each camera, thereby allowing ranges in depth to be detected and quantified. The cameras also typically require a same optics for comparison of images. The relative position and orientation of the two cameras are typically rigidly maintained in order for stereo algorithms to work correctly.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is generally directed to use of a zoom lens with a guidance camera deployed on a vehicle, such as an unmanned aerial vehicle (UAV). The guidance camera may be implemented as a single camera, a group of cameras, and/or a stereo camera pair. The stereo camera pair may be configured to determine distances of objects in view of the camera, which may be calculated based on a known disparity between the cameras.

As the UAV performs different tasks, executes different flight controls, and/or detects different objects via imagery captured by guidance camera(s), the UAV may modify a zoom level used for the guidance camera(s) to enable capture of imagery to facilitate successful execution of the different tasks and flight controls. For example, when the UAV executes a change in a heading of the UAV, the zoom of the guidance camera(s) may be modified to capture a wide angle field of view (zoom out) to enable detection of objects that may be in the flight path of the UAV during the change of heading or may move into the flight path. As another example, when the UAV approaches an objective marker, such as a landing marker, the zoom lens may be continually zoomed out, stepwise or linearly, to enable increasing a field of view as the UAV approaches the objective marker. This may enable the UAV to identify the objective marker from a distance when the zoom lens is zoomed in (narrow field of view), and then continually, or from time to time, increase the field of view by zooming out to enable detection of objects near the objective marker, such as obstacles that the UAV will avoid. During a landing operation or when depositing an item at a location, such as a package at a customer's residence, the adjustment of the zoom lens and thus field of view may enable capture of imagery that assists in navigation and obstacle avoidance by the UAV.

In some embodiments, the zoom lens may be implemented as a linear movement zoom lens that physically changes the focal length of a lens to adjust a zoom level, and thus the field of view of imagery captured by a camera. However, this type of lens may be relatively heavy, may include many parts prone to failure due to excessive vibration, weather, and/or other factors, and may require additional time to change a zoom level due to physical movement of the lens to achieve a different focal length. In various embodiments, the zoom lens may be implemented as a lens array which includes different lenses that can be switched out, via movement of the lens array and/or by redirecting light via a light direction device (e.g., a mirror, a prism, etc.). The lens array may weigh less than a linear movement zoom lens, may include fewer parts prone to failure, and may enable quick change in zoom to a predetermined zoom level associated with a selected lens.

Stereo cameras may be used as guidance cameras. The zoom level of the stereo cameras may be adjusted as described above, which may change a field of view of the cameras. In order to maintain overlap between the field of view of each camera, the cameras may be repositioned/directed in response to changes in a zoom level. In addition, the zoom level may be coordinated for each camera, such as using the lens array discussed above. In various embodiments, the stereo camera pair may be used to calculate distances of objects. The calculation may use a difference in location between objects in images taken from cameras at two different locations, while factoring in a direction or known disparity of the cameras. When a zoom level is changes for a stereo camera pair, at least one of the cameras may be repositioned to provide sufficient overlap of the field of view of the cameras to enable distance calculations.

The techniques and systems described herein may be implemented in a number of ways. Example implementations are provided below with reference to the following figures.

Figure 1:
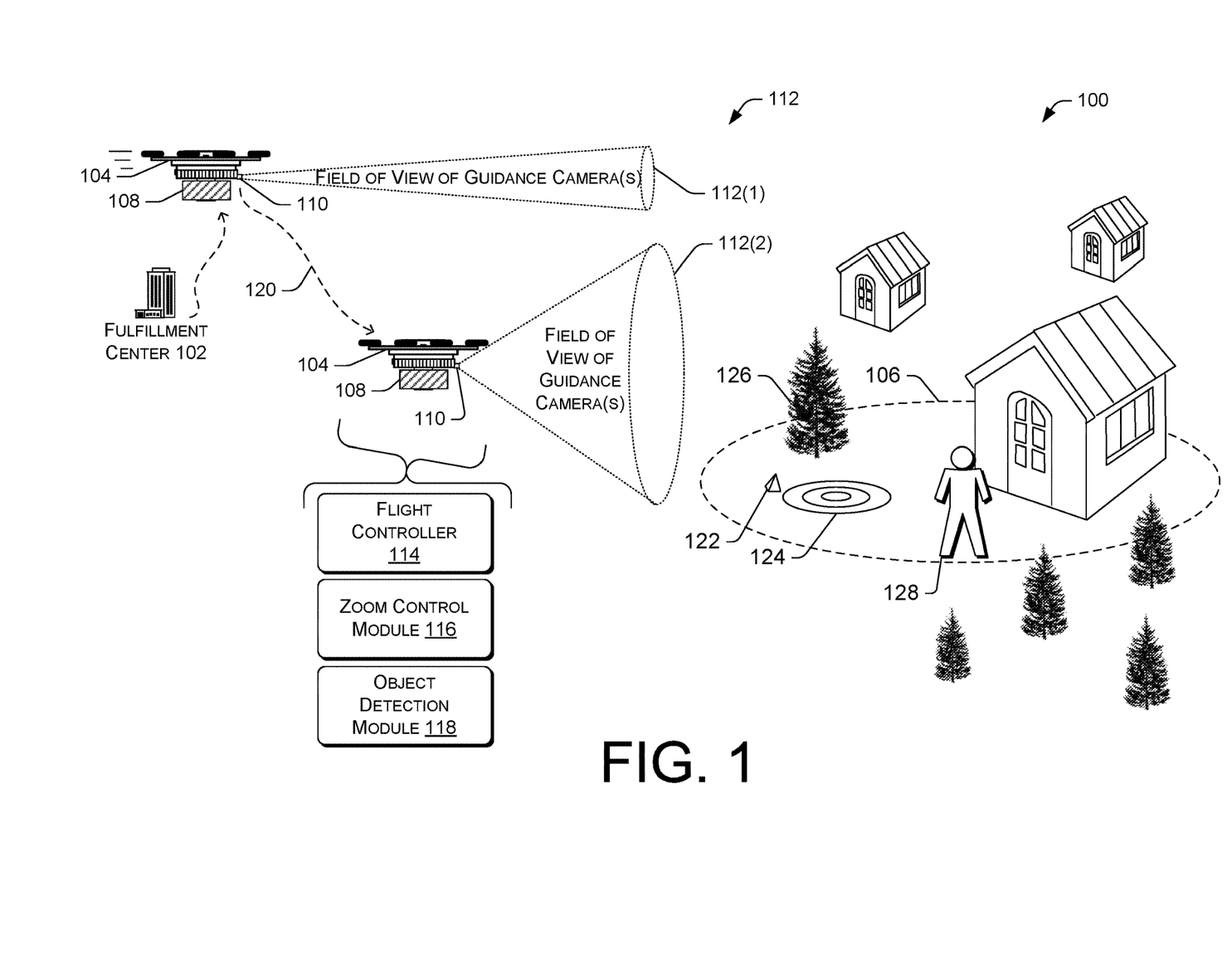
FIG. 1 is a schematic diagram of an illustrative environment that includes an unmanned aerial vehicle (UAV) configured with one or more guidance camera, each including a zoom lens configured to change a level of zoom.

FIG. 1 is a schematic diagram of an illustrative environment 100 that includes a UAV configured with one or more guidance camera(s), each including a zoom lens configured to change a level of zoom. The environment 100 includes a fulfillment center (FC) 102 where a UAV 104 may originate a flight directed to a destination 106, such as a location associated with a recipient of a package 108 transported by the UAV 104.

The UAV 104 may be equipped with one or more guidance cameras 110 which may each include a zoom lens. The zoom lens may enable change in an optical zoom of the guidance camera(s) 110. The zoom lens may be implemented as a lens array, which includes different lenses that can be individually aligned with the camera, or may be implemented as a linear movement zoom lens, which moves a lens to change a focal length. The guidance camera(s) 110 may use different zoom levels (or settings) at different times during a flight. For example, the guidance camera(s) 110 may a first zoom level 112(1) when flying at a cruising altitude during a transit stage of a flight, and may modify a zoom to a second zoom level 112(2) at a different time, such as after a change in flight control, detection of an object or objective marker, and/or for other reasons. Many different zoom levels may be used, and at different times during the flight by the UAV 104. For example, during the transport state, the zoom lens may change a zoom level from time to time, and possibly in response to different events, to enable detection of obstacles to avoid, detect an objective marker, and/or for other reasons. The UAV 104 may, at times, conduct autonomous flight using information captured by the guidance camera(s).

The UAV may be equipped with a number of components to enable the UAV 104 to perform operations during the delivery of the package and to control the zoom level of the guidance camera(s) 110. The components may include a flight controller 114, a zoom control module 116, and an object detection module 118, as well as other components discussed below with reference to FIG. 2.

The UAV 104 may travel under control of the flight controller 114 and along a flight path 120 toward the destination 106. The flight controller 114 may continually or from time to time provide controls to cause change in a velocity of the UAV, a change in heading, a change in altitude, a change in orientation, and/or other changes (e.g., pitch, roll, yaw, hover, etc.). In addition, the UAV 104 may execute different controls based on different flight scenarios, such as a takeoff stage, a transport stage, a package deposit stage, and/or a landing stage of flight. These controls and/or scenarios may be used as input by the zoom control module 116.

The zoom control module 116 may change a zoom level associated with the guidance camera(s) 110 based on input from the flight controller 114, analysis of imagery captured by the guidance camera(s) 110, and/or based on other information. For example, when the flight controller 114 increases a velocity of the UAV, the zoom control module 116 may cause the guidance camera(s) 110 to increase a zoom level (zoom in) to enable earlier detection of objects in a flight path of the UAV 104. As the flight controller 114 reduces the velocity of the UAV 104, the zoom control module 116 may cause the guidance camera(s) 110 to decrease a zoom level (zoom out) to detect objects closer to the UAV while increasing a field of view of the guidance camera(s) 110.

The object detection module 118 may identify objects in imagery captured by the guidance camera(s) 110, which may be used to inform navigation of the UAV via the flight controller 114, to adjust the zoom level via the zoom control module 116, and for other reasons such as to provide communications to the object or to a central command, etc. For example, the object detection module 118 may identify an objective marker 112 via analysis of imagery captured by the guidance camera(s) 110. The objective marker 122 may be associated with a waypoint, a drop zone 124 for the destination 106, and/or associated with other locations. The object detection module 118 may make imagery information available to the zoom control module 116. As the UAV 104 approaches the objective marker 122, the zoom control module 116 may cause the guidance camera(s) 110 to decrease a zoom level (zoom out) to detect objects closer to the UAV (e.g., in a periphery, etc.) while increasing a field of view of the guidance camera(s) 110. By zooming out, the guidance camera(s) 110 may capture imagery of objects, such as obstacles 126, a bystander 128, and/or other objects to avoid during flight or when depositing the package 108.

Figure 2:
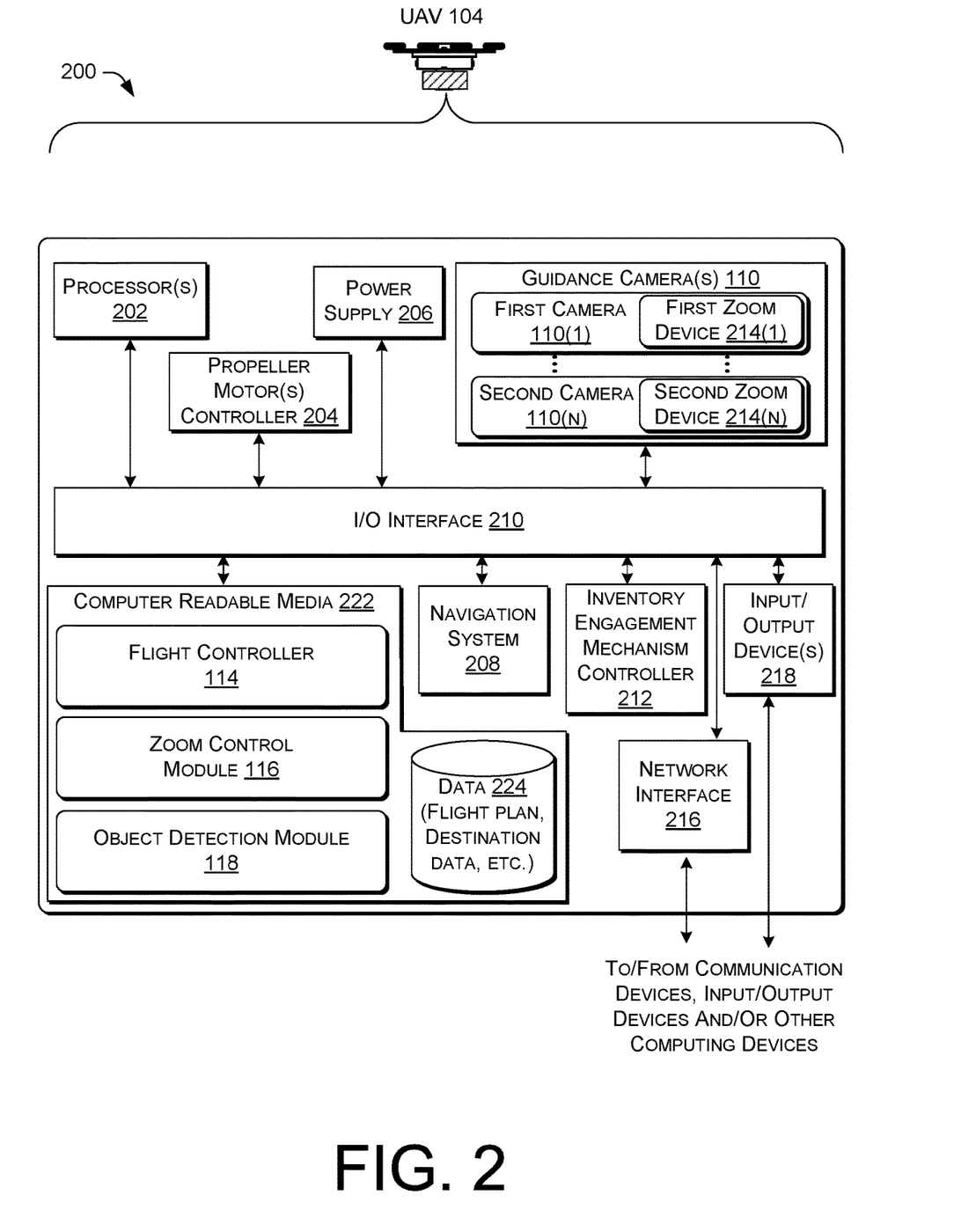
FIG. 2 is a block diagram of an illustrative UAV architecture of the UAV shown in FIG. 1.

FIG. 2 is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 222 via an input/output (I/O) interface 210. The UAV architecture 200 may also include a propeller motor controller 204, power supply module 206 and/or a navigation system 208. The UAV architecture 200 further includes an inventory engagement mechanism controller 212 to interact with the package 108, the guidance camera(s) 110, zoom devices 214(1) and 214(n), a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 222 may be configured to store executable instructions/modules, data, flight paths, and/or data items accessible by the processor(s) 202. In various implementations, the non-transitory computer readable media 222 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 222 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 222, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 222) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 222, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory, such as the package 108. For example, when the UAV is positioned over a level surface at a delivery location, the inventory engagement mechanism controller 212 may provide an instruction to a motor that controls the inventory engagement mechanism to release the package 108.

As shown in FIG. 2, the guidance camera(s) 110 may include a first camera 110(1) associated with a first zoom device 214(1) and a second camera 110(n) associated with a second zoom device 214(n). However, more or fewer cameras and zoom lenses may be used. The zoom devices may control an optical zoom of the associated camera, such as by changing a focal length associated with the camera, by aligning a lens with the camera, or by directing light from a lens into the camera, as described below. In various embodiment, each camera may include a zoom device, which may operate in conjunction with other zoom devices to maintain a consistent zoom level across different devices, such as when the guidance camera(s) are employed as a stereo camera pair used for depth calculations of objects.

The network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The input/output devices 218 may, in some implementations, include accelerometers and/or other input/output devices commonly used in aviation. Multiple input/output devices 218 may be present and controlled by the UAV architecture 200. One or more of these sensors may be utilized to assist in landings as well as avoiding obstacles during flight.

In some embodiments, the computer readable media 222 may store the flight controller 114, the zoom control module 116, and the object detection module 118. The components may access and/or write data 224, which may include flight plan data, log data, destination data, image data, and object data, and so forth. The operations of the flight controller 114, the zoom control module 116, and the object detection module 118 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 104 is discussed below.

Although FIGS. 1 and 2 depict a UAV, other vehicles may deploy the guidance camera(s) and zoom device(s) described herein, such as land vehicles (cars, trucks, etc.), marine vehicles (boats, ships, etc.), and/or other types of aircraft.

Figure 3:
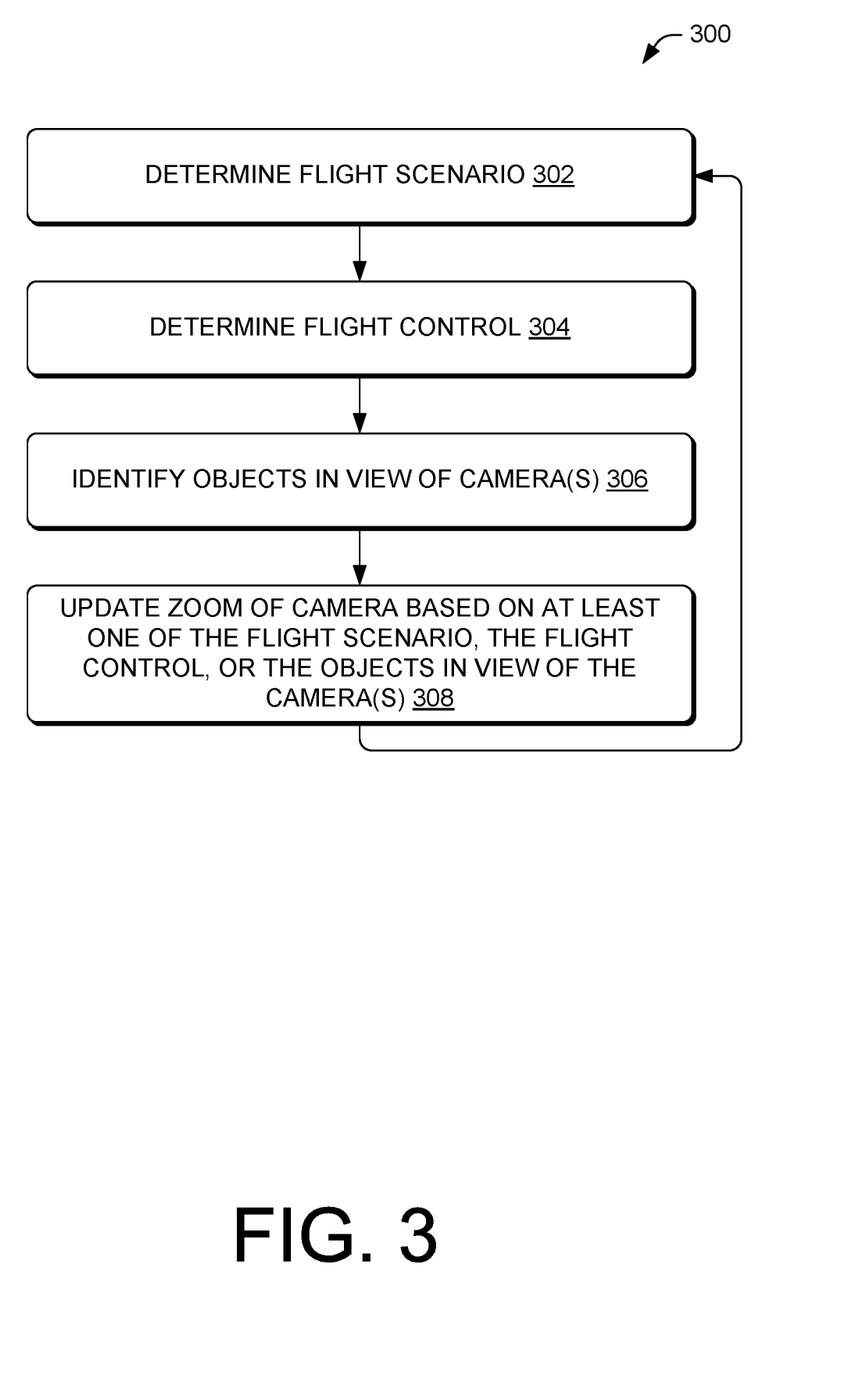
FIG. 3 is a flow diagram of an illustrative process to change a zoom of a camera based on a flight scenario, a flight control, and/or an object in view of a camera.
Figure 4:
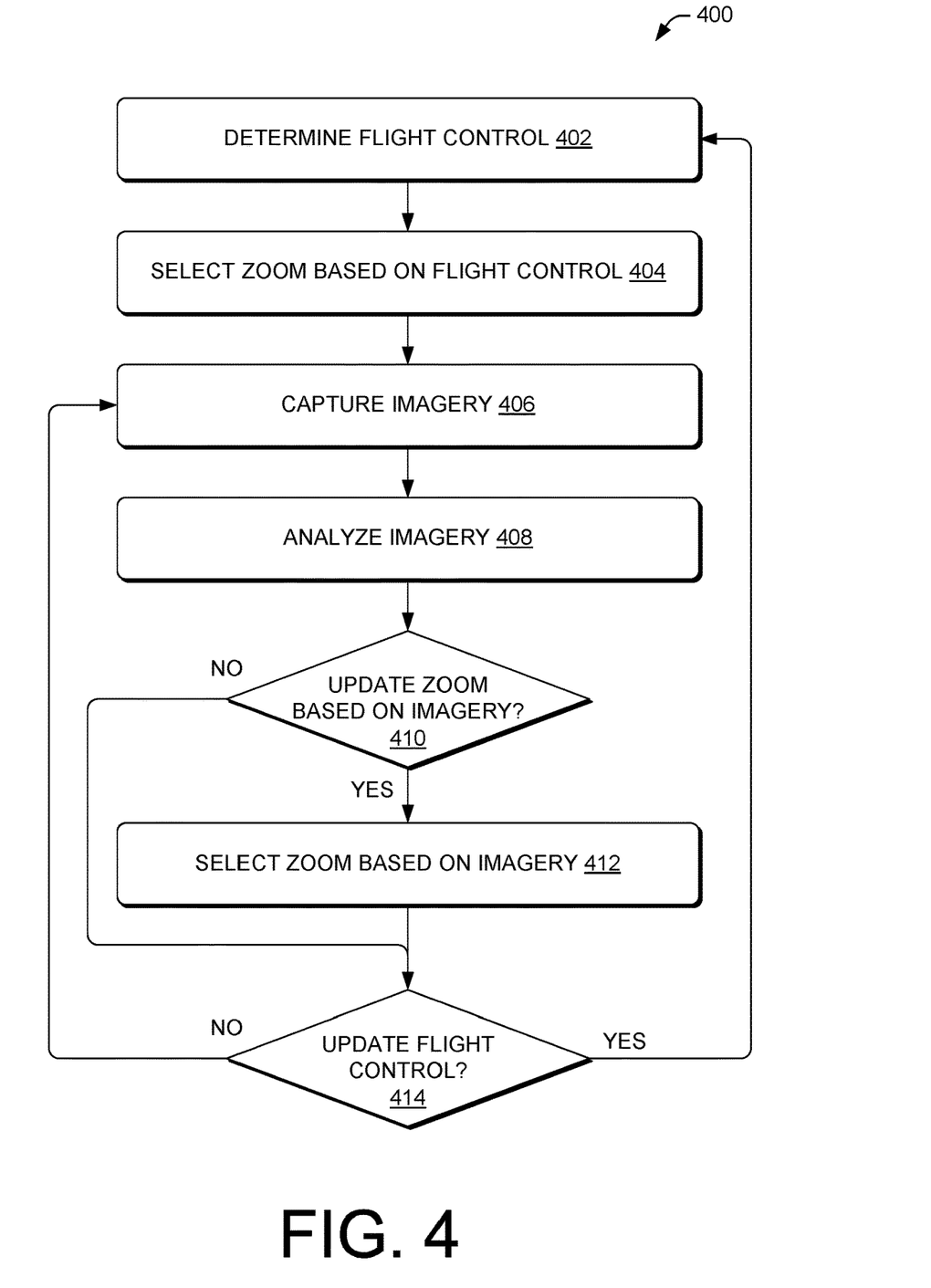
FIG. 4 is a flow diagram of an illustrative process to change a zoom of a camera based at least on a flight control and captured imagery.
Figure 5:
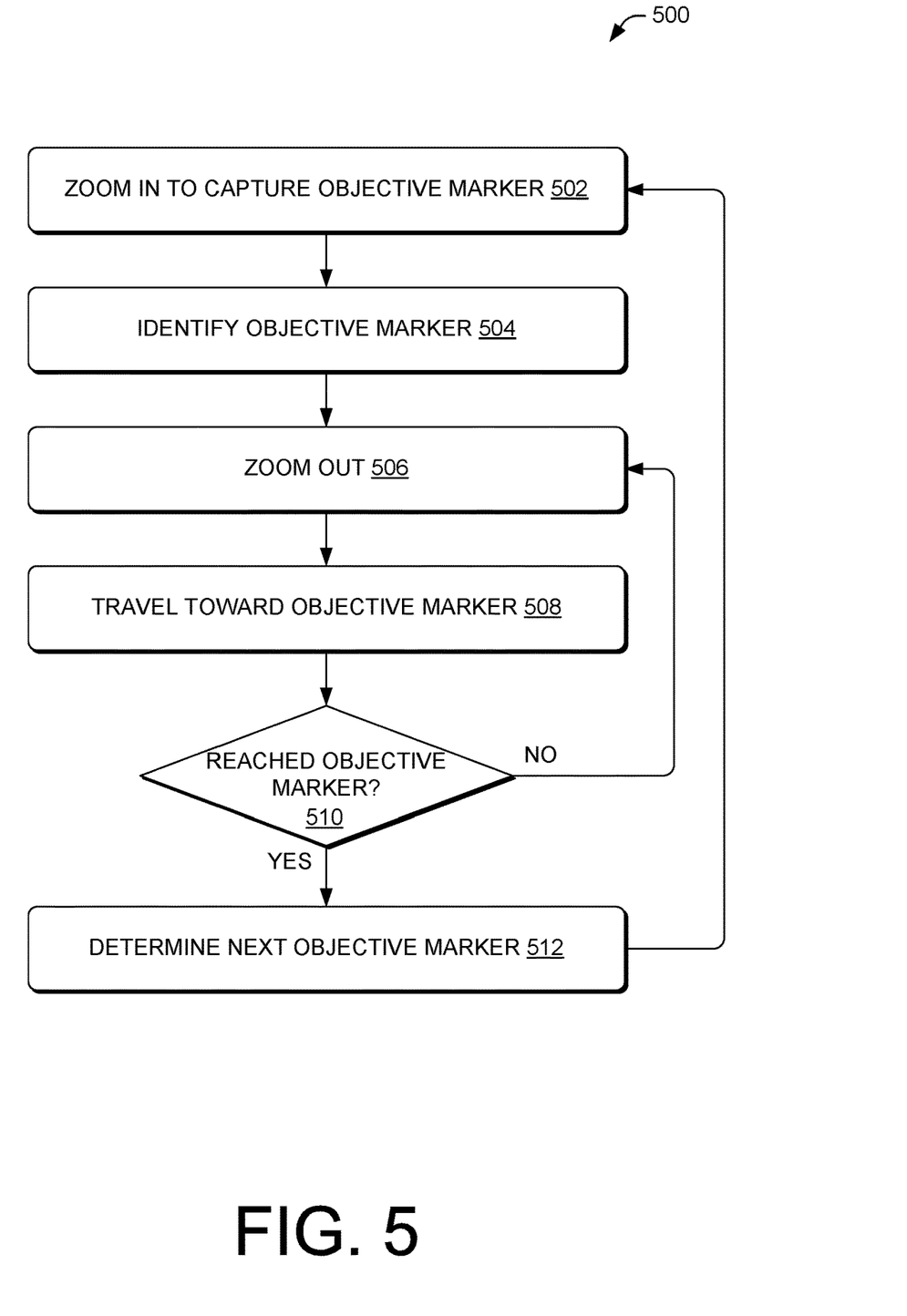
FIG. 5 is a flow diagram of an illustrative process to change a zoom based on an approach to an objective marker.

FIGS. 3-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to change a zoom of a camera based on a flight scenario, a flight control, and/or an object in view of a camera. The process 300 may be implemented in the environment 100 and by the UAV architecture 200 described above, or in other environments and architectures.

At 302, the flight controller 112 may determine a flight scenario to be executed by the UAV 104. For example, the flight scenario may be a takeoff scenario, a landing scenario, a transport scenario, deposit of the package 108 at the destination 106, detection of an obstacle in a flight path of the UAV 104, and/or other flight scenarios that cause the flight controller 114 to take action to control the UAV 104 based on the scenario. In some embodiments, the flight controller 114 may implement certain protocols for a particular scenario, such as to implement hover flight for a landing scenario and implement forward flight in a transport scenario, for example. In addition, the scenarios may be used to inform or determine, by the zoom control module 116, a zoom level for the guidance camera(s) 110 used to capture imagery, which is used as input by the flight controller 114.

At 304, the flight controller 114 may output specific flight controls to control the UAV 104. For example, the flight controller 114 may cause individual rotors to increase or decrease power, or revolutions per minute, to increase or decrease a velocity of the UAV, change an altitude, steer the UAV, and/or for other reasons. These flight controls caused by the flight controller 114 may be used to inform or determine, by the zoom control module 116, a zoom level for the guidance camera(s) 110 used to capture imagery, which is used as input by the flight controller 114.

At 306, imagery captured by the guidance camera(s) 110 may be captured and analyzed to determine objects in the imagery. The objects may be objective markers, obstacles, other vehicles, buildings, landscape, and/or other objects. The object detection module 118 may determine objects in the imagery. In some embodiments, the object detection module 118 may associate the object with an objective marker, an obstacle to avoid, and so forth. This information may be used to inform the flight controller 114, as discussed above. In various embodiments, the detection of an object that is or is not positively identified may be used as an input to inform or determine, by the zoom control module 116, a zoom level for the guidance camera(s) 110 used to capture imagery. For example, if an object is identified off at a distance and in flight path of the UAV 104, but not identified by the object detection module 118, the zoom control module 116 may cause the guidance camera(s) to increase a zoom to enable positive identification of the object. The object may then be positively identified, and this information may be used to inform the flight controller 114 as to whether a change in heading or other change in flight control is warranted.

At 308, the zoom control module 116 may update a zoom level and implement the zoom level, via the zoom devices 214 of the guidance camera(s) 110, based on at least one of the flight scenario determined at the operation 302, the flight control determined at the operation 304, or the object identified at the operation 308. For example, the zoom control module 116 may change a zoom level of one or more of the guidance camera(s), possibly at a same time, based on the various input. The input from the operations 302, 304, and 306 may be prioritized by the zoom control module 116 to enable the zoom control module 116 to resolve conflicting information and/or information that results in conflicting zoom operations (e.g., one source of information suggests the guidance camera(s) should zoom out while another source of information suggests the guidance camera(s) should zoom in). Additional operations of the zoom control module 116 are presented below to further describe these operations.

FIG. 4 is a flow diagram of an illustrative process 400 to change a zoom of a camera based at least on a flight control and captured imagery. The process 400 may be implemented in the environment 100 and by the UAV architecture 200 described above, or in other environments and architectures.

At 402, the flight controller 114 may determine a flight control to implement for the UAV 104. The flight control may include execution of a scenario, such as to hover to initiate an approach to a destination, or another type of execution of a different scenario. The flight control may include adjustments during a scenario, such as changes in velocity, altitude, heading, orientation, and so forth. Thus, the flight control may include a scenario, a specific flight control, or both.

At 404, the zoom control module 116 may determine and implement, via the zoom devices 214, a zoom level based on the flight control determined at the operation 402. The zoom may be based on a scenario (e.g., track an obstacle marker, traverse a span of distance, etc.) and/or individual flight controls that adjust velocity, altitude, heading, orientation, etc. The zoom control module 116 may make selections and implement those selection from time to time to enable capture of imagery that informs the flight controller 114.

At 406, the guidance camera(s) 110 may capture imagery having a particular zoom level based on the control of the zoom control module 116. The imagery may be stored, at least temporarily for analysis by the object detection module 118, among other possibly uses, such as transmission to a central command or storage in a flight log.

At 408, the object detection module 118 may analyze the imagery captured at the operation 406 to detect and/or identify objects in the imagery. For example, the object detection module 118 may detect and/or identify objective markers, obstacles, other vehicles, buildings, landscape, and/or other objects. The object detection module 118 may also detect an unknown object, which may prompt further analysis and/or a change in zoom level to identify the object.

At 410, the zoom control module 116 may determine whether to change a zoom level of the guidance camera(s) 110 based on the analysis of the imagery obtained from the operation 408. For example, when an object is imaged, but not identified due to lack of detail in the image of the object, the zoom control module 116 may determine to increase a zoom level (zoom in) to enable identification of the object. As another example, when an object is identified, the zoom control module 116 may determine to decrease a zoom level (zoom out) to enable tracking the object while increasing a field of view of the guidance camera(s) 110 for object avoidance purposes or for other reasons. As yet another example, the zoom control module 116 may make no change in zoom based on the analysis of the imagery from the operation 408, such as when the object is determine not to be a threat to the UAV, to be outside of a flight path or envelope of the UAV, and/or for other reasons. When the zoom control module 116 determines to change a zoom level of the guidance camera(s) 110 based on the analysis of the imagery obtained from the operation 408 (following the "yes" route"), then the process 400 may advance to an operation 412.

At 412, the zoom control module 116 may determine to change the zoom level of the zoom devices 214(1) and/or 214(n) of the guidance camera(s) 110 as discussed above and may implement the change. The determination of the zoom level by the zoom control module 116 using the imagery (e.g., based on the information from the operation 408) may override a zoom level determined based on the flight control (e.g., based on the information from the operation 402).

Following the operation 412, or when the zoom control module 116 determines not to change a zoom level of the guidance camera(s) 110 based on the analysis of the imagery obtained from the operation 408 (following the "no" route"), then the process 400 may advance to a decision operation 414. At 414, the flight controller 114 may determine whether to update a flight control, such as based on the captured and analyzed imagery (from the operation 408). When additional imagery is determined to be captured using a different zoom level selected and implemented at the operation 412, then process 400 may advance to the operation 406 via the "no" route from the decision operation 414 to enable capturing additional imagery with the updated zoom level and to analyze that new imagery via the operation 408. When the flight control is to be updated (following the "yes" route from the decision operation 414), then the process 400 may advance to the operation 402 to determine the flight control. In such instances, the zoom level that was based on the imagery from the operation 412 may or may not be updated at 404 based on changes to the flight control. For example, a change to the flight control at 402 may cause a change in zoom at 404 that overrides the change in zoom determined at the operation 412.

FIG. 5 is a flow diagram of an illustrative process 500 to change a zoom based on an approach to an objective marker. The process 500 may be implemented in the environment 100 and by the UAV architecture 200 described above, or in other environments and architectures. The process 500 may involve performance of a scenario, such as a landing scenario that involves identification of an objective marker (e.g., a drop zone marker, etc.) or of another type of scenario executed by the flight controller 114 of the UAV 104.

At 502, the zoom control module 116 may cause the zoom devices 214(1) and 214(n) to zoom in to capture imagery and identify an objective marker, such as a destination, a navigational marker, or another marker. For example, the UAV 104 may use other information to inform the zoom operation, such as GPS information that indicates a general location of the objective marker.

At 504, the object identification module 118 may positively identify the objective marker, such as to verify that a detected object is the objective marker. By increasing the zoom at the operation 502, the imagery analyzed by the object identification module 118 may include sufficient detail and clarity to enable the positive identification of the objective marker.

At 506, the zoom control module 116 may zoom out in response to the positive identification of the objective marker by the object detection module 118 at the operation 504. By zooming out, the zoom control module 116 may enable the guidance camera(s) 110 to capture a wider field of view of imagery, which may assist the object detection module 118 in performing object avoidance while continuing to track a location of the objective marker.

At 508, the UAV may continue to travel toward the objective marker, possibly via changes to the flight control by the flight controller 114. For example, the flight controller 114 may make changes in the heading, velocity, altitude, and/or orientation of the UAV 104 as the UAV 104 moves toward the objective marker.

At 510, the flight controller 114 may determine, possibly via input by the object detection module 118, distance information determined from analysis of stereo images captured by the guidance camera(s) 110, GPS information, and/or other information, whether the UAV 104 has reached the objective marker or reached a threshold distance from the threshold marker (possibly above the objective marker, etc.). When the UAV 104 has not reached the objective marker or the threshold distance therefrom (following the "no" route from the decision operation 510), then the process 500 may return to the operation 506 to continue changes in zoom and capture of imagery as the UAV 104 continues to travel toward the objective marker. When the UAV 104 has reached the objective marker or the threshold distance therefrom (following the "yes" route from the decision operation 510), then the process 500 may advance to an operation 512. At 512, the UAV 104 may determine a next objective marker and the process 500 may advance to the operation 502 assuming the objective marker reached is not a final destination of the UAV 104.

Figure 6A:
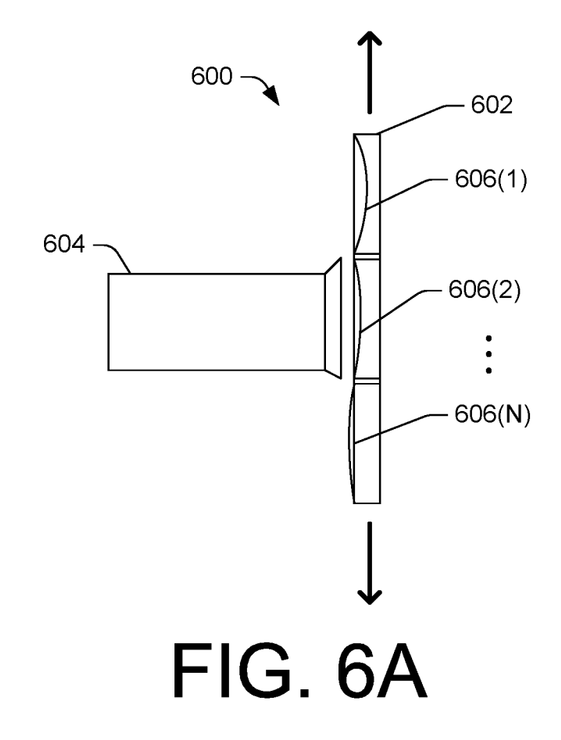
FIGS. 6A and 6B are schematic diagrams of an illustrative camera system including a lens array moveable relative to a guidance camera to enable alignment of different optical lenses with the guidance camera.
Figure 6B:
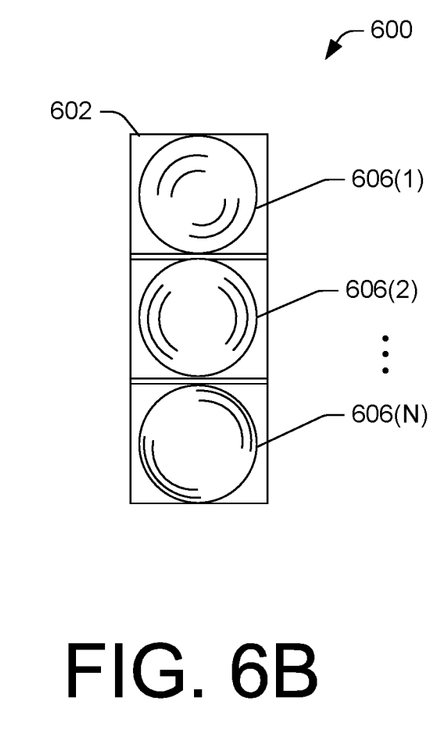

FIGS. 6A and 6B are schematic diagrams of an illustrative camera system 600.

FIG. 6A shows a side elevation view of the camera system 600 that includes a lens array 602 moveable relative to a guidance camera 604 to enable alignment of different optical lenses 606(1), 606(2), . . . , 606(N) with the guidance camera 604. The different optical lenses may be individually and selectively aligned with the guidance camera 604 such that light travels through the selected lens and is captured by the guidance camera 604. The lens array 602 may be arranged in a linear configuration, or possibly in other configurations (e.g., column of lenses, row or lenses, grid of lenses, etc.). By including multiple lenses, the lens array 602 may provide the camera system 600 with a zoom range at least partly between a first zoom level and a second zoom level.

An actuator may move the lens array 602 to position a specific lens in alignment with the guidance camera 604. The lens array 602 may include features that enable movement of the lens array 602, such as teeth that engage with a drive wheel, a guide, a movement arm or other movement mechanisms to move the lens array relative to the guidance camera 604.

FIG. 6B shows front elevation view of the lens array 602. As shown in FIGS. 6A and 6B, the optical lenses 606(1), 606(2), . . . , 606(N) may each have a lens profile to create or produce a different optical zoom selected based on design requirements for the camera system 600. For example, a first lens 606(1) may be a wide angle lens used to view objects near the camera system via a wide field of view. A second lens 606(2) may have a standard angle lens used to view objects during normal operation, which may be similar in zoom level to conventional camera lens used for guidance cameras. The second lens 606(2) may include a standard field of view that is narrower compared to the first lens 606(1). A third lens 606(3) may include a zoom lens used to view objects far off a distance from the camera system, which includes a narrow field of view as compared to the first lens 606(1) and the second lens 606(2). Although three lenses are shown in the lens array 602, more or fewer lenses may be included in the lens array 602. When multiple cameras are used and are associated with lens arrays, the lens arrays may be linked or otherwise powered to move in a coordinated way to change a zoom level for each camera at about the same time.

Figure 7A:
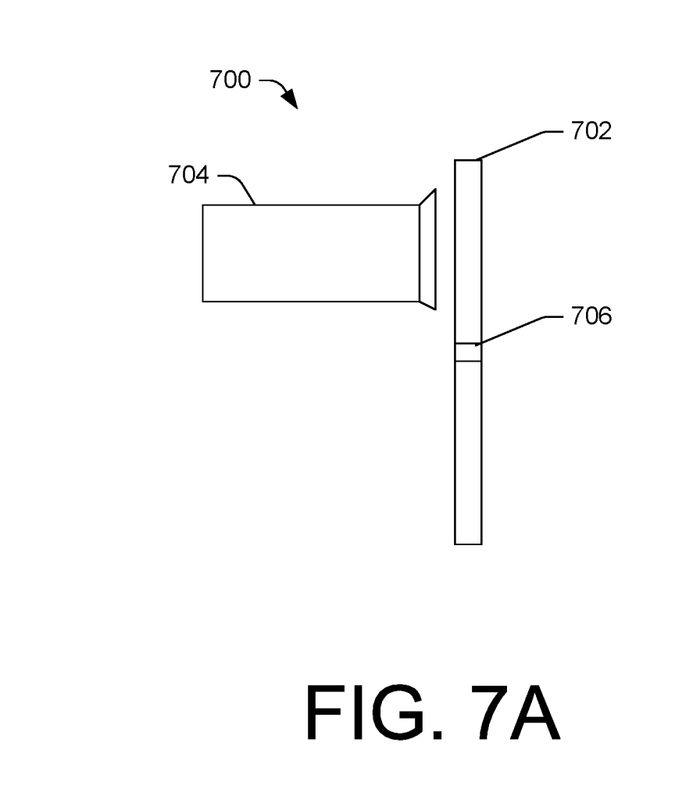
FIGS. 7A and 7B are schematic diagrams of an illustrative camera system including a wheel lens array that rotates relative to a guidance camera to enable alignment of different optical lenses with the guidance camera.
Figure 7B:
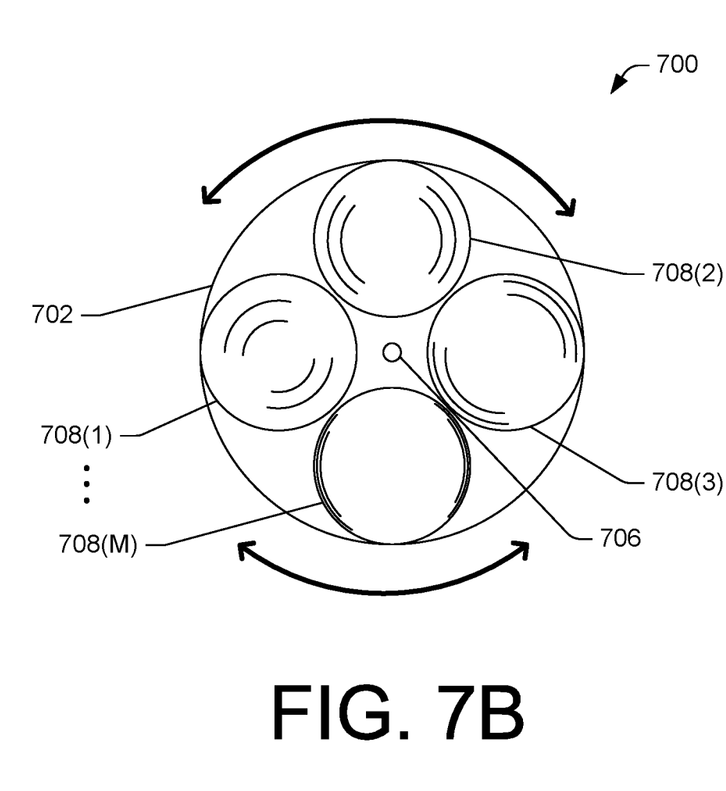

FIGS. 7A and 7B are schematic diagrams of an illustrative camera system 700. FIG. 7A shows a side elevation view of the camera system 700 that includes a wheel lens array 702 that rotates about an axis 706 and relative to a guidance camera 704 to enable alignment of different optical lenses with the guidance camera 704. As described herein, the term "lens array" includes the "wheel lens array."

FIG. 7B shows the different optical lenses 708(1), 708 (2), 708(3), . . . , 708(M) that can be aligned, via rotation of the wheel lens array 702 with the guidance camera 604. The different optical lenses may be individually and selectively aligned with the guidance camera 704 such that light travels through the selected lens and is captured by the guidance camera 704. The wheel lens array 702 may include the lens arranged in a circle to enable rotation to a different lenses to change a zoom of the guidance camera 704. A motor may move the wheel lens array, possibly via a geared configuration or a direct drive configuration. The motor may move the wheel lens array 702 to position a specific lens in alignment with the guidance camera 704.

The optical lenses 708(1), 708 (2), 708(3), . . . , 708(M) may each have a lens profile to create or produce a different optical zoom selected based on design requirements for the camera system 700. For example, a first lens 708(1) may be a wide angle lens used to view objects near the camera system via a wide field of view. A second lens 708(2) may have a standard angle lens used to view objects during normal operation, which may be similar in zoom level to conventional camera lens used for guidance cameras. The second lens 708(2) may include a standard field of view that is narrower compared to the first lens 606(1). A third lens 706(3) may include a first zoom lens used to view objects far off a distance from the camera system 700, which includes a narrow field of view as compared to the first lens 708(1) and the second lens 708(2). A fourth lens 706(M) may include a second zoom lens used to view objects very far off a distance from the camera system 700, which includes a narrower field of view as compared to the third lens 708(3). However, in some embodiments, the fourth lens may include a wide angle lens that includes a field of view different than the first lens 708(1). Although four lenses are shown in the wheel lens array 702, more or fewer lenses may be included in the wheel lens array 702. When multiple cameras are used and are associated with wheel lens arrays, the wheel lens arrays may be linked or otherwise powered to move in a coordinated way to change a zoom level for each camera at about the same time.

Figure 8A:
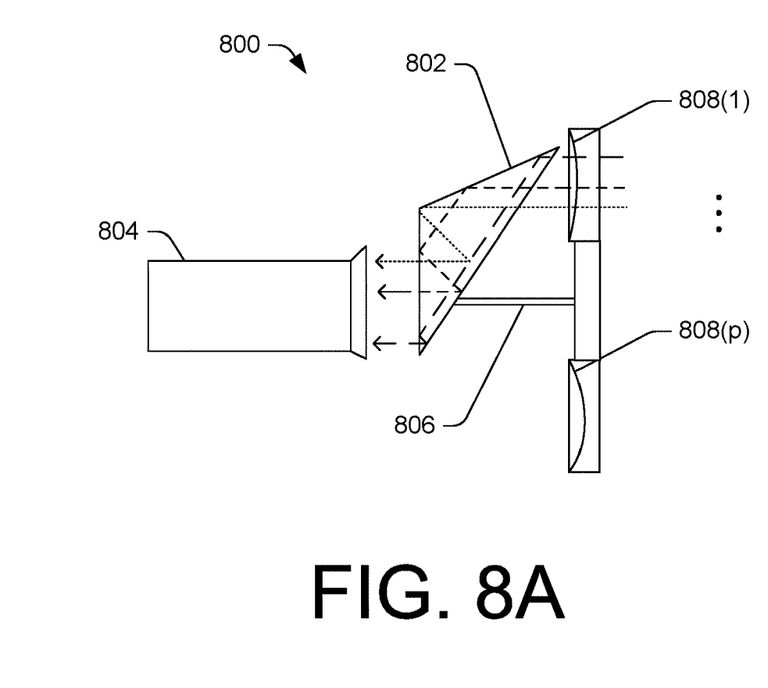
FIGS. 8A and 8B are schematic diagrams of an illustrative camera system including a light direction device used to direct light from a zoom lens into a guidance camera.
Figure 8B:
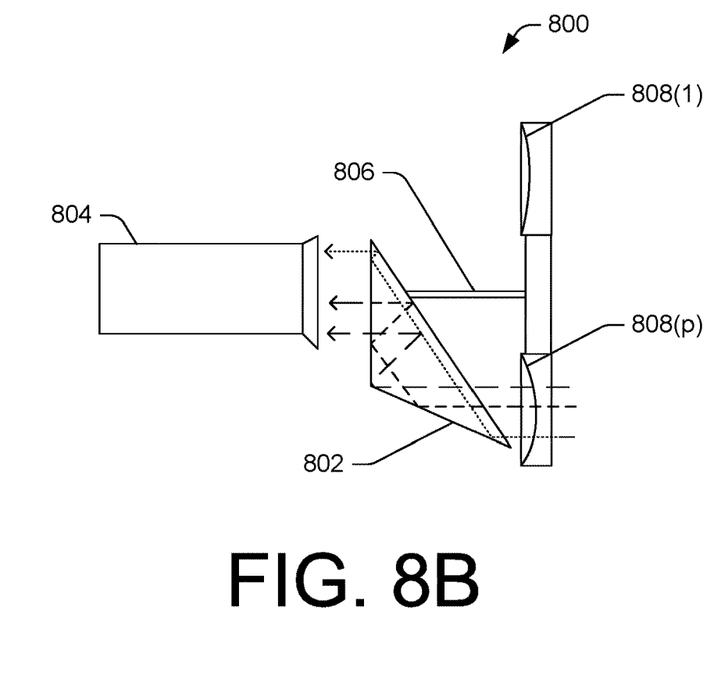

FIGS. 8A and 8B are schematic diagrams of an illustrative camera system 800. FIG. 8A shows a side elevation view of the camera system 800 that includes a light direction device 802 used to direct light from a first zoom lens 808(1) into a guidance camera 804. The light direction device 802 may be configured to rotate about an axis 806 to enable changing which lens directs light into the guidance camera 804. FIG. 8B shows a side elevation view of the camera system 800 that includes the light direction device 802 rotated to a position to direct light from a second zoom lens 808(p) into a guidance camera 804. Although two different lenses are shown in the camera system 800, additional lenses may be included in the camera system 800.

The light direction device 802 may be implemented as one or more mirrors, prisms, and/or other light directing devices. For example, a prism may be rotated about the axis 806 to alternate use of the lenses 808(1), . . . , 808(p). In some embodiments, mirrors may be adjusted, such as by changing an angle or reflection, to reflect light from a desired lens into the guidance camera 804. Movement of the light direction device 802 may be caused by a motor, an actuator, a solenoid, and/or other movement devices. When multiple cameras are used and are associated with multiple light direction devices, the light direction devices may be linked or otherwise powered to move in a coordinated way to change a zoom level for each camera at about the same time.

The optical lenses 808(1), . . . , 808(p) may each have a lens profile to create or produce a different optical zoom selected based on design requirements for the camera system 800. For example, a first lens 808(1) may be a wide angle lens used to view objects near the camera system via a wide field of view. A second lens 808(p) may have a standard angle lens used to view objects during normal operation, which may be similar in zoom level to conventional camera lens used for guidance cameras. However, either the first lens 808(1) or the second lens 808(p) may be a zoom lens used to view objects at a distance.

Figure 9A:
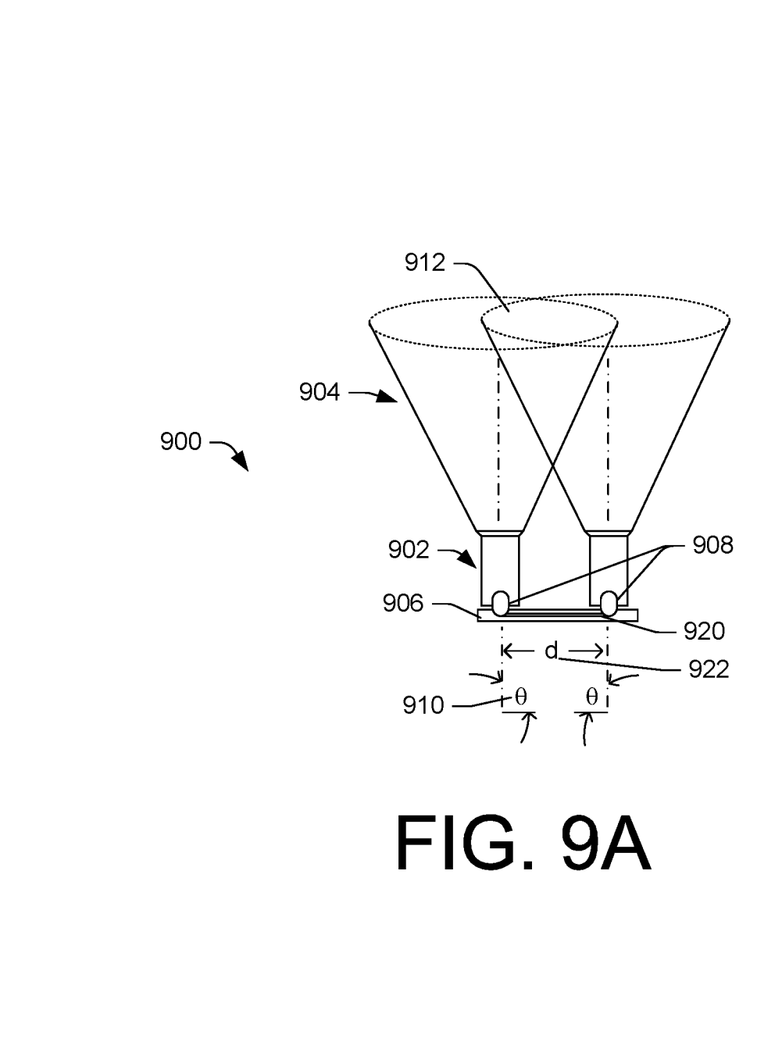
FIGS. 9A and 9B are schematic diagrams of an illustrative stereo camera pair configured with zoom lenses, where the cameras are movable to maintain a predetermined overlap between captured images of the cameras.
Figure 9B:
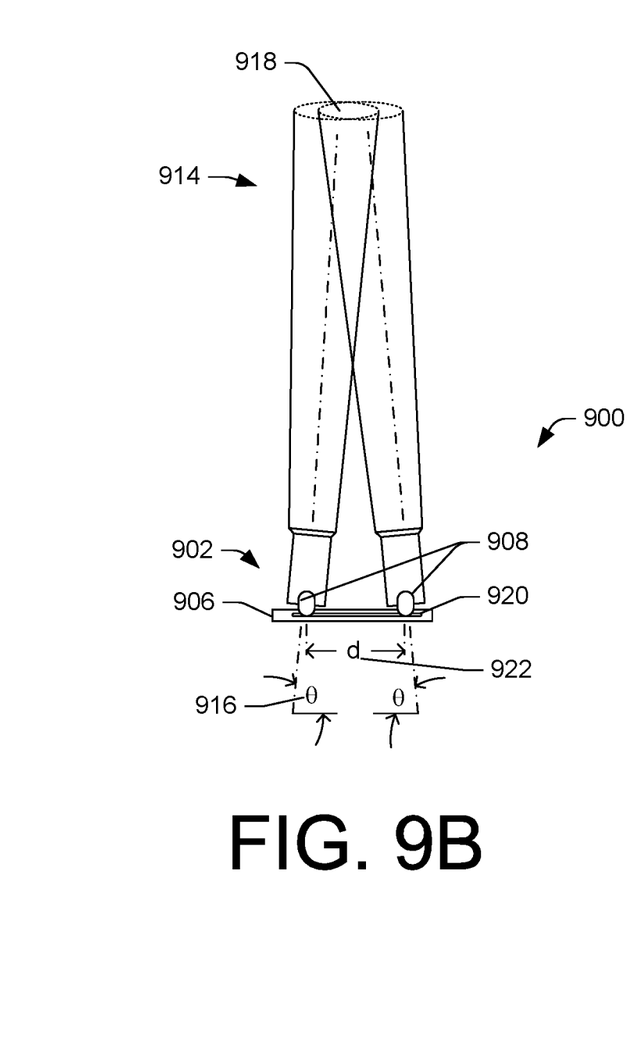

FIGS. 9A and 9B are schematic diagrams of an illustrative stereo camera pair 900 configured with zoom lenses, where the cameras are movable to maintain a predetermined overlap between captured images of the guidance cameras. FIG. 9A shows a top elevation view of cameras 902 having a first zoom 904 that includes a relatively large field of view of a wide angle lens. The cameras 902 may be movably mounted on a structure 906 via an actuator 908. The actuator may change a direction of one or more cameras to adjust an overlap in a field of view of the stereo camera pair 900. The cameras may be positioned at a first angle θ 910 to allow for desired overlap 912 in the field of view of the cameras 902. The first angle θ 910 may be greater or less than 90 degrees, thus the camera may tilt inwards toward one another or outwards away from one another, or both.

FIG. 9B shows a top elevation view of cameras 902 having a second zoom 914 that includes a relatively small field of view as compared to the first zoom 904. The cameras 902 may be movably mounted on the structure 906 via the actuator 908 and may be adjusted in response to a change in zoom, possibly via a linkage that links the change in zoom with a change in position of at least one camera. The cameras may be positioned at a second angle θ 916 to allow for desired overlap 918 in the field of view of the cameras 902.

In some embodiments, the cameras 902 may be equipped with the lens array 602, the wheel lens array 702, or the light direction device 802 to enable fast and accurate changes in use of different lenses. This zoom level of each of the cameras 902 may be coordinated to be the same to enable distance calculation via the stereo camera pair 900. When the lens array 602, the wheel lens array 702, or the light direction device 802 is used with the cameras, the movement of the lens array 602, the wheel lens array 702, or the light direction device 802 may be coordinated for each camera such that each camera has the same zoom and field of view, and thus changes are made for each camera at the same time or nearly the same time.

In various embodiments, mechanical devices, such as linkages, may be used to ensure movement occurs for each camera at a same time, such as having different lens arrays connected to one another or actuated by a same device. In addition, movement of the cameras 902 may also be coordinated with changes in zoom to ensure sufficient overlap in the field of view of the cameras 902. For example, mechanical devices, such as linkages, may cause movement of the alignment of the cameras 902 along with movement of the lens array 602, the wheel lens array 702, or the light direction device 802.

In some embodiments, at least one of the cameras may be movable or configured to tilt independently to capture imagery in a specific location in some instances. For example, the cameras could capture imagery at a first time. Processing of the imagery may determine that additional imagery of one or more object of interest is desired. At a second time, at least one of the cameras may then be decoupled or otherwise move independent of another camera to individually aim toward and zoom in/out on the one or more object of interest and capture additional imagery at a third time. At a fourth time, the camera(s) may then reposition and/or adjust the tilt to couple with another camera and/or resume operation in coordination with another camera to resume stereo camera operations.

In various embodiments, the cameras may include a variable and/or dynamic iris that may be controllable to modify the f-number associated with a respective camera. This enables a camera to modify a depth of field, shutter speed, and resolution. An example of how this ratio affects vision systems is that a smaller diameter iris would have a wider depth of field, and a larger diameter iris would have a shallower depth of field, assuming a system's lens (focal length) and sensor have the same specifications. In another example, the depth of field may be changed by changing the focal length (by changing lenses as described above) while keeping the aperture the same. However, if the iris aperture is adjusted, (enlarged, reduced), the original depth of field prior to a change in lens could be maintained. Adding a variable iris may provide more flexibility over how much information can be extracted from imagery captured by the cameras.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   implementing a vehicle control, determined by an autonomous vehicle controller, to control movement of a vehicle;
   determining a first zoom level for a guidance camera system coupled to the vehicle based at least in part on the vehicle control, the guidance camera system including a stereo camera pair and one or more zoom lens devices configured to provide different zoom levels to each camera of the stereo camera pair;
   capturing imagery at the first zoom level determined for the guidance camera system;
   identifying, based at least in part on the imagery captured at the first zoom level, an objective marker in the imagery;
   calculating a distance between the objective marker and the vehicle based at least in part on the first zoom level of the one or more zoom lens devices and a disparity of cameras for the stereo camera pair;
   determining a second zoom level based at least in part on the distance of the objective marker being less than or equal to a distance threshold;
   causing the one or more zoom lens devices to decrease the stereo camera pair from the first zoom level to the second zoom level;
   tracking the objective marker in the imagery captured by the guidance camera system; and
   determining, by the autonomous vehicle controller, a subsequent vehicle control to control the movement of the vehicle based at least in part on the second zoom level.

2. The method as recited in claim 1, further comprising:
   analyzing the imagery at the first zoom level captured by the guidance camera system to identify an object in the imagery; and
   wherein determining the second zoom level is based at least in part on a second distance between the object in the imagery and the vehicle.

3. The method as recited in claim 1, further comprising adjusting the first zoom level for each camera of the stereo camera pair at a same time or near a same time prior to capturing the imagery.

4. The method as recited in claim 3, further comprising repositioning at least one camera of the stereo camera pair in response to determining the first zoom level, the repositioning to create an overlap in one or more fields of view associated with stereo camera pair to enable the calculating of the distance.

5. The method as recited in claim 1, wherein the one or more zoom lens devices include a lens array, further comprising implementing the first zoom level by causing the lens array to move relative to the stereo camera pair to align a lens of the lens array with each camera of the stereo camera pair.

6. The method as recited in claim 1, wherein the one or more zoom lens devices include a light direction device, further comprising implementing the first zoom level by causing the light direction device to be oriented to direct light from a lens of a plurality of lenses into each camera of the stereo camera pair.

7. The method as recited in claim 1, further comprising:
   determining a scenario to perform using the vehicle, the scenario including at least one of a transport scenario or a deposit of a package scenario; and
   adjusting the first zoom level for the guidance camera system coupled to the vehicle based at least in part on the scenario.

8. A vehicle comprising:
   a propulsion system to cause movement of the vehicle;
   a guidance camera system to capture imagery, the guidance camera system including a stereo camera pair and a zoom lens array to direct light into each camera of the stereo camera pair, the zoom lens array to include a zoom range at least partly encompassed by a first zoom level, a second zoom level, and a third zoom level, wherein the first zoom level and the third zoom level include fields of view that are larger than the second zoom level;

one or more processors; and memory to store computer-executable instructions executable by the one or more processors to perform operations comprising:

generating, by a vehicle controller, vehicle controls for the vehicle;

transmitting the vehicle controls from the vehicle controller to the propulsion system to cause directed movement of the vehicle;

detecting an object in the imagery captured by the guidance camera system using the first zoom level;

causing the zoom lens array to change the first zoom level to the second zoom level that is greater than the first zoom level;

identifying that the object is an objective marker based at least in part on the change from the first zoom level to the second zoom level;

causing, based at least in part on the objective marker, the zoom lens array to change the second zoom level to the third zoom level;

updating the vehicle controls for the vehicle based at least in part on identifying the objective marker; and tracking the objective marker in the imagery captured by the guidance camera using the third zoom level.

9. The vehicle as recited in claim 8, wherein the vehicle controls generated by the vehicle controller cause at least one of a first change in heading, a second change in velocity, or a third change in altitude.

10. The vehicle as recited in claim 8, wherein the third zoom level is further modified within the zoom range, based at least in part on a distance between the objective marker and the vehicle.

11. The vehicle as recited in claim 8, wherein the vehicle controls include a vehicle maneuver scenario including at least one of a takeoff scenario, a landing scenario, or a transport scenario.

12. The vehicle as recited in claim 8, wherein the guidance camera system is configured to move a lens of the zoom lens array in alignment with each camera of the stereo camera pair.

13. The vehicle as recited in claim 8, further comprising a light direction device to selectively cause light from a lens of a plurality of lenses of the zoom lens array to be directed into the guidance camera system.

14. The method as recited in claim 2, wherein:
the imagery is a first imagery;
the method further comprises capturing a second imagery at the second zoom level; and
determining the subsequent vehicle control is based at least in part on the second imagery captured at the second zoom level.

15. The vehicle as recited in claim 8, wherein:
the imagery is a first imagery; and
the guidance camera system is further configured to capture second imagery at the second zoom level and third imagery at the third zoom level; and the vehicle controller performs a scenario based at least on the second imagery and the third imagery.

16. A guidance camera system comprising:
a stereo camera pair;
a zoom lens array to direct light to the stereo camera pair;
one or more processors; and
memory to store computer-executable instructions executable by the one or more processors to perform operations comprising:

detecting one or more objects in imagery captured by the guidance camera system at a first zoom level;

identifying an objective marker in the imagery captured by the guidance camera, wherein the objective marker is included in the one or more objects;

determining, based at least in part on the objective marker, a distance between the guidance camera and the objective marker;

determining, based at least in part on the distance, a second zoom level that is less than the first zoom level;

modifying, based at least in part on the distance being less than or equal to a distance threshold, the zoom lens array to change from the first zoom level to the second zoom level and track the one or more objects detected in the captured imagery; and transmitting information associated with the one or more objects to a vehicle controller.

17. The guidance camera system as recited in claim 16, wherein the zoom lens array has a linear configuration, a grid configuration, or a wheel configuration.

18. The guidance camera system as recited in claim 16, wherein the operations further comprise modifying a position of at least one of a first camera or a second camera of the stereo camera pair to provide sufficient overlap of a field of view of each of the first camera and the second camera to enable calculation of a distance of objects.

19. The guidance camera system as recited in claim 16, wherein the one or more objects include at least an unidentified object and the operations further comprise:

determining that the one or more objects include an unidentified object;

modifying the zoom lens array to capture second imagery at a third zoom level;

identifying, based at least in part on the second imagery, the unidentified object captured by the guidance camera system; and modifying based at least in part on identification of the unidentified object, the zoom lens array to change from the third zoom level to the second zoom level.

20. The guidance camera system as recited in claim 16, wherein the operations further comprise:

determining, based at least in part on the objective marker, an approach velocity associated with the objective marker; and modifying, based at least in part on the approach velocity, the second zoom level proportional to the approach velocity, wherein the second zoom level is reduced as the distance between the zoom lens array and the objective marker is reduced.

* * * * *